United States Patent [19]

Armbrust

[11] Patent Number: 4,604,004
[45] Date of Patent: Aug. 5, 1986

[54] CUTTING TOOL ASSEMBLY
[75] Inventor: William D. Armbrust, Cary, N.C.
[73] Assignee: Kennametal Inc., Latrobe, Pa.
[21] Appl. No.: 805,246
[22] Filed: Dec. 3, 1985

Related U.S. Application Data

[63] Continuation of Ser. No. 356,833, Mar. 10, 1982, abandoned.

[51] Int. Cl.$^4$ .............................................. B26D 1/00
[52] U.S. Cl. .................................... 407/110; 407/50;
407/72; 407/91; 407/117; 83/845
[58] Field of Search ............. 407/117, 110, 115, 116,
407/50, 72, 91, 49; 83/844, 845

[56] References Cited

U.S. PATENT DOCUMENTS

| 899,608 | 9/1908 | Newbold | 407/50 |
| 959,328 | 5/1910 | Eynon | 407/72 |
| 1,090,205 | 3/1914 | Gorton | 407/49 |
| 3,561,086 | 2/1971 | Milewski | 407/117 |
| 3,775,818 | 12/1973 | Sirola | 407/117 |
| 3,780,408 | 12/1973 | McCreery | 407/117 |
| 4,357,123 | 11/1982 | Zweekly | 407/117 |

Primary Examiner—Leonidas Vlachos
Attorney, Agent, or Firm—Lawrence R. Burns

[57] ABSTRACT

Disclosed is a cutting tool assembly having a hard, wear resistant insert, a shim and a blade body. The shim has a rearwardly extending recess for receiving the insert. The insert abuts against a top, bottom and rear portion of the shim recess. The shim recess tapers toward the open end of the shim recess to springingly hold the insert. The blade body has a downwardly and rearwardly extending recess on a first end for receiving the shim and insert. The blade body recess is also inclined to the longitudinal axis of the blade body. The blade body recess tapers toward the blade body so as to wedgingly hold the shim and insert.

26 Claims, 10 Drawing Figures

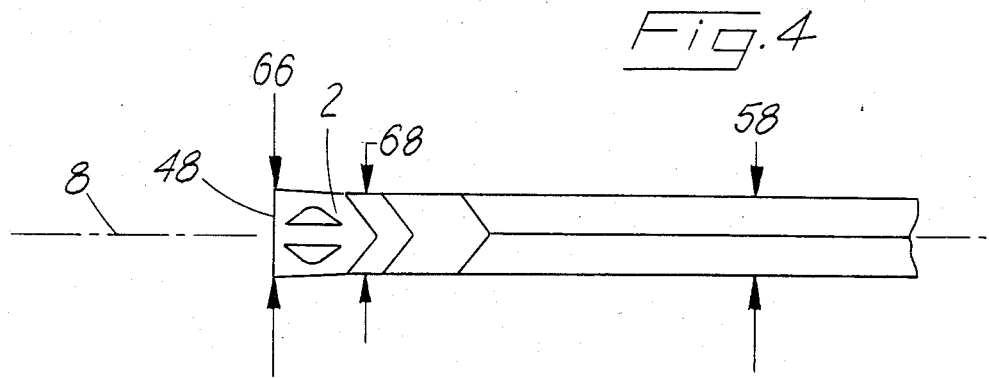
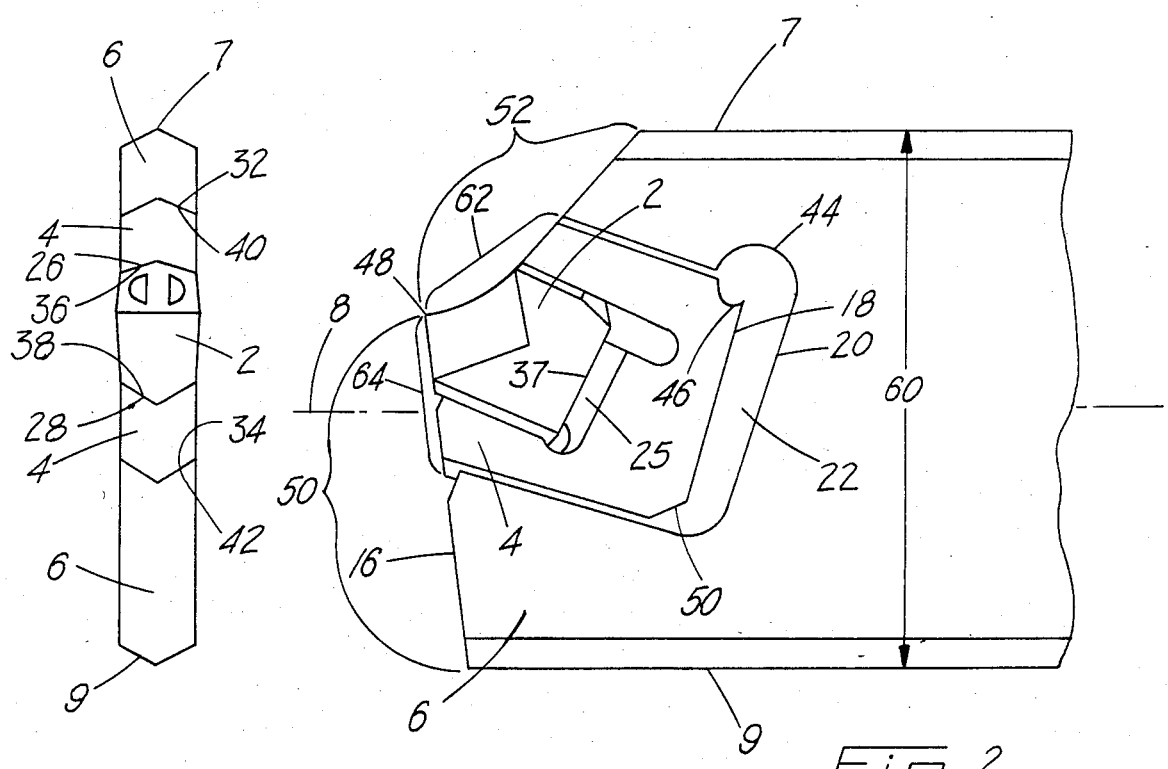

CUTTING TOOL ASSEMBLY

This application is a continuation of application Ser. No. 356,833, filed Mar. 10, 1982, now abandoned.

FIELD OF THE INVENTION

This invention relates to the field of cutting tools, such as those used for threading and grooving. More specifically, this invention has most direct application to cutoff tools and tool holders.

In the operation of the type of cutoff tooling with which this application is concerned, the cutoff tool is fed into a rotating workpiece. Due to the rotation and the forward movement of the tool, a groove is eventually cut into the workpiece. When the tool has been fed through the entire radius of the workpiece, a portion of the workpiece will have been cut off.

Cutoff tools are subject to considerable wear and abuse. To make the tool last longer, that part of the tool that contacts the workpiece is made from a hard wear resistant material. It would, of course, not be economical or practical to make the whole tool from hard wear resistant material. Often, the hard wear resistant material contacting the workpiece is in the form of a replaceable insert.

A complication to be considered in the design of the tool holder is that the forward portion of the tool holder, just behind the cutting insert, must be thinner than the insert so that it will not contact the workpiece as the insert moved into the material.

The invention of this application is most concerned with the particular arrangement for holding an insert in a tool holder.

Replaceable inserts and several types of holders therefor are known in the prior art. One type of holder is where a clamp and clamping plate are used to hold the insert in place. Exemplary of this type of holder is U.S. Pat. No. 3,780,408, assigned to the present assignee.

Another type of holder is shown in U.S. Pat. No. 207,003. In this patent, a cam operates to apply pressure so as to lock the cutting portion in place.

A third type is where the cutting portion is held in place by a wedging action, as shown, for example, in U.S. Pat. No. 4,195,956.

In U.S. Pat. No. 3,785,021, the insert is held by a resilient clamping arm.

It is an object of this invention to have a durable cutting tool with an easily replaceable insert.

It is also an object to have a tool holder that firmly holds the insert so that the insert will not wobble or move when it contacts the workpiece.

It is a further object to have an insert that is easily and quickly replaceable in the tool holder.

BRIEF SUMMARY OF THE INVENTION

According to the present invention, there is disclosed a cutting tool assembly having a hard, wear resistant insert, a shim and a blade body. The blade body has a longitudinal axis. The shim has a rearwardly extending recess for receiving the insert, which rests aginst the rear portion of the shim recess. The shim recess tapers toward the open end of the shim recess to springingly hold the insert. The blade body has a downwardly and rearwardly extending recess on a first end for receiving the shim and insert. The blade body recess is also inclined to the longitudinal axis of the blade body. The blade body recess tapers toward the blade body to wedgingly hold the shim and insert.

When the insert, shim and blade are fully engaged, the rear peripheral edge of the shim and the rear portion of the blade body recess form a gap.

The shim may have a longitudinal slot extending rearward of the shim recess.

It is preferable that the shim have a land portion of reduced cross sectional thickness rearward of the rear portion of the shim recess. The land becomes the bottom of a notch formed when the shim recess receives the insert.

Preferably, the upper and lower peripheral edges of the insert are V-shaped and the upper and lower portions of the shim recess have V-shaped grooves. The V-shaped edges of the insert slidably engage the V-shaped grooves of the shim recess.

It is also preferable that the upper and lower peripheral edges of the shim are V-shaped and the upper and lower portions of the blade body recess have V-shaped grooves. The V-shaped edges of the shim slidably engage the V-shaped grooves of the blade body recess.

More preferably, the upper peripheral edge of the insert is comprised of a rear upper portion and a forward upper portion. The rear upper portion is downwardly inclined with respect to the forward upper portion. The insert also has a chip control slot with a width varying above its length. The slot extends upwardly and away from the forward cutting portion.

Even more preferably, the thickness of the insert in plan view is greatest at the cutting edge. The thickness of the insert is greater than the thickness of the shim and blade.

The blade body recess has a semi-circular portion at the juncture of the upper and rear portions of the blade body recess. The shim has a V-shaped notch at the juncture of the upper and rear peripheral edges of the shim. The semi-circular portion communicates with the V-shaped notch when the shim and insert are received by the blade recess.

The shim may have a chamfer at the juncture of the lower and rear peripheral edges of said shim.

In another embodiment of the blade body of the cutting tool assembly, the blade body has a recess on a second end. Preferably, the second blade body recess is oriented such that when the blade is turned end over end, the blade body recess on the second end will be in the same position formerly occupied by the blade body recess on the first end.

Preferably, the blade body is generally flat and bar-like and has a thickness when viewed in plan much less than the width when viewed from the side. The blade body will assume this shape whether there is a blade body recess on one end or both ends.

It is preferable also that the profile of the insert, shim and blade body, when fully engaged, is smooth and curvilinear above the cutting edge of the insert. Further, the profile of the insert, shim and blade, when fully engaged, is smooth and straight below the cutting edge of the insert.

According to the invention, there is also disclosed a shim and insert for use in a cutting tool assembly. The insert is a hard wear resistant insert and has a forward cutting portion, a seating portion directly opposed to the cutting portion, an upper peripheral edge and a lower peripheral edge. The shim has an upper arm of substantially uniform cross section and a rearwardly extending recess for receiving the insert. The recess has an upper portion, a lower portion and a rear portion. The upper and lower portions of the shim recess engage the upper and lower peripheral edges, respectively, of the insert with the recess tapering toward the open end of said recess to springingly hold the insert. When the shim and insert are fully engaged, the seating portion of the insert rests against the rear portion of the shim recess.

The shim may also have a longitudinal slot extending rearward of the shim recess.

It is preferable that the shim have a land portion of reduced cross sectional thickness rearward of the rear portion of the shim recess. The land becomes the bottom of a notch formed between the shim and the seating portion of the insert when the shim recess receives the insert.

Preferably, the upper and lower peripheral edges of the insert are V-shaped and the upper and lower portions of the shim recess have V-shaped grooves. The V-shaped edges of the insert slidably engage the V-shaped grooves of the shim recess.

Preferably, also, the shim has an upper, lower and rear peripheral edge. The upper and lower peripheral edges are V-shaped.

It is also preferable for the upper peripheral edge of the insert to be comprised of a rear upper portion adjacent to the seating portion and a forward upper portion adjacent to the forward cutting portion. The rear upper portion is downwardly inclined with respect to the forward upper portion. The insert may also have a chip control slot with a width varying along its length. The slot extends upwardly and away from the forward cutting portion.

More preferably, the shim has a V-shaped notch at the juncture of the upper and rear peripheral edges of the shim. The shim may also have a chamfer at the juncture of the lower and rear peripheral edges of the shim.

It is also preferable that the thickness of the insert in plan view is greatest at the cutting edge. The thickness of the insert is greater than the thickness of the shim.

Even more preferably, the profile of the insert and shim, when fully engaed, is smooth and curvilinear above the cutting edge of the insert. The profile of the insert and shim, when fully engaged, is smooth and straight below the cutting edge of the insert.

BRIEF DESCRIPTION OF THE DRAWINGS

The exact nature of the present invention will become more clearly apparent upon reference to the following detailed specification taken in connection with the accompanying drawings in which:

FIG. 2 is a side view of a fully assembled insert, shim and blade body.

FIG. 3 is a frontal view of the insert, shim and blade body of FIG. 2.

FIG. 4 is a plan view of the insert, shim and blade body of FIG. 2.

DETAILED DESCRIPTION OF THE INVENTION

Figure 1:
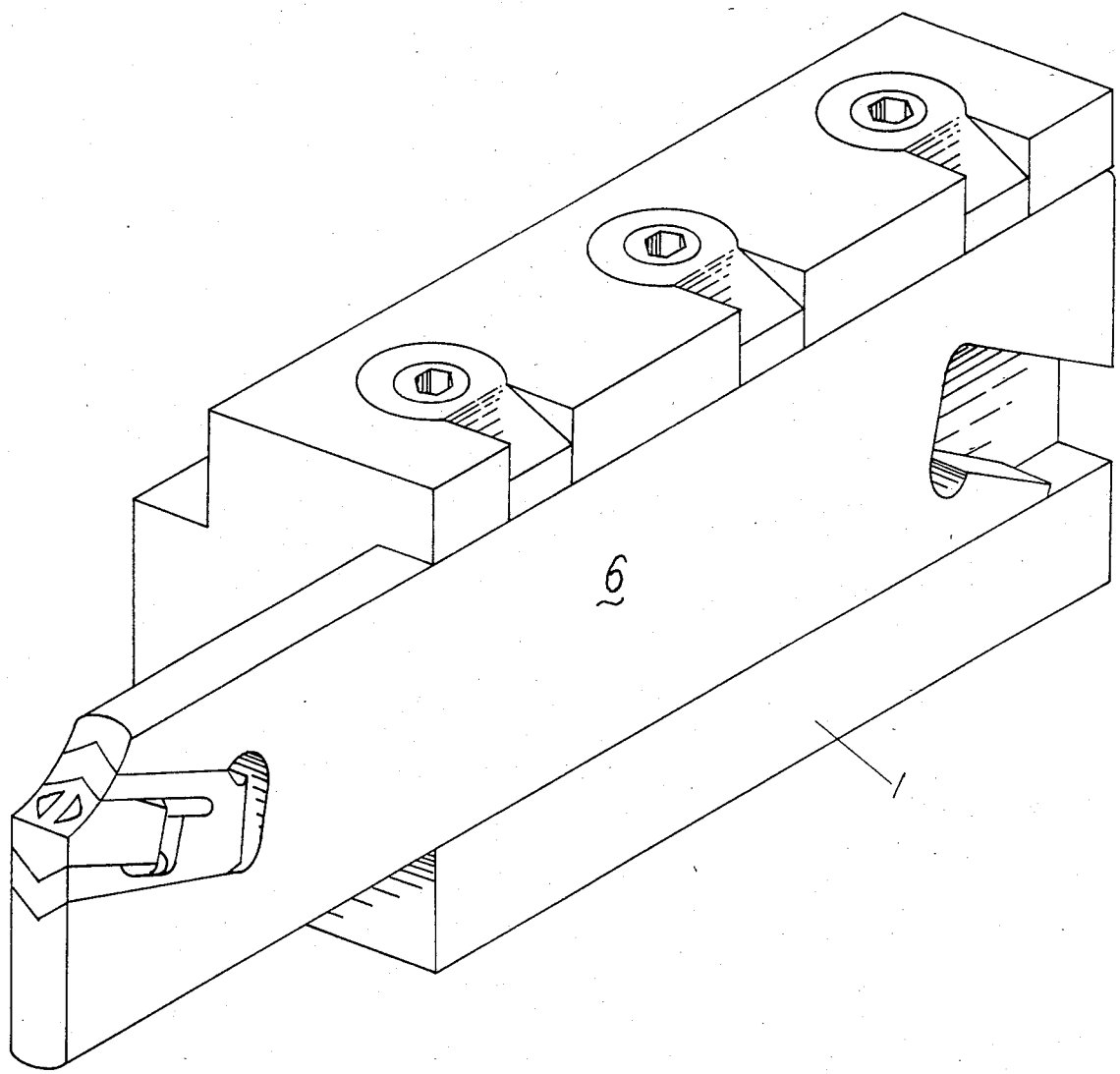
FIG. 1 is a perspective view of a cutoff tool assembly in a block.

Referring now to the drawings in more detail, FIG. 1 shows the assembled cutting tool assembly as it would normally appear ready for use. The blade body 6 is held in a suitable fixturing block 1, several types of which are well known in the prior art.

Figure 5:
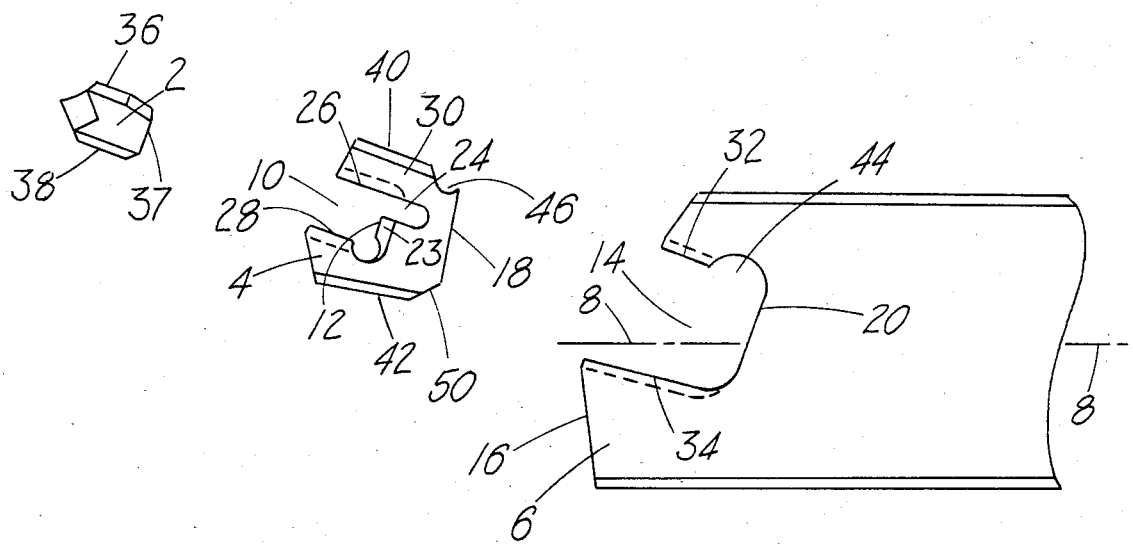
FIG. 5 is an exploded view of an insert, shim and blade body.

FIGS. 2 through 4 show the cutting tool assembly in greater detail. FIG. 5 shows the assembly as it would appear disassembled.

According to the invention, the cutting tool assembly comprises a hard, wear resistant insert 2 having a forward cutting portion 48, a shim 4 and a blade body 6, having a longitudinal axis 8. As best seen in FIG. 5, the shim 4 has a rearwardly extending recess 10 for receiving the insert 2. The insert rests against the rear portion 12 of the shim recess. The shim recess tapers toward the open end of the shim recess to springingly hold the insert. The blade body 6 has a downwardly and rearwardly extending recess 14 on a first end 16 for receiving the shim and insert. The blade body recess is also inclined to the longitudinal axis 8 of the blade body. The blade body recess tapers toward the blade body to wedgingly hold the shim and insert.

The rear peripheral edge 18 of the shim and the rear portion 20 of the blade body recess form a gap 22 when the insert, shim and blade body are fully engaged, as shown in FIG. 2.

The shim may have a longitudinal slot 24 extending rearward of the shim recess. As will be described in more detail shortly, the slot is desirable for providing a certain amount of resiliency to the shim.

Preferably, as shown in FIG. 5, the shim has a land portion 23 of reduced cross sectional thickness rearward of the rear portion 12 of the shim recess 10. As best seen in FIG. 2, the land becomes the bottom of a notch 25 formed when the shim recess receives the insert. The purpose of this notch is indicated below.

Assembly of the cutting tool assembly is accomplished by first inserting the insert into the shim recess. The upper portion 26 and the lower portion 28 of the shim recess are not parallel but, instead, converge at some point forward of the shim recess. This causes the shim recess to taper toward the open end of the shim recess. As the open end of the shim recess is slightly smaller than the insert, the upper arm 30 of the shim must be somewhat resilient.

The longitudinal slot rearward of the shim recess operates to allow the upper arm to move up or down so as to provide the upper arm with some resiliency. Necessarily, the resiliency of the upper arm causes the insert to be springingly held in the shim recess. Removal of the insert can be done by inserting a screw driver or similar implement in the notch 25 of the shim and then twisting. This causes the resilient upper arm to move upward and the insert to move forward. Further twisting causes the insert to pop out of the shim recess.

The upper 32 and lower 34 portions of the blade body recess are nonparallel and converge at some point rearward of the blade body recess. Therefore, the blade body recess will taper inwardly. The final step in the assembly will then be accomplished by inserting the insert and shim into the blade body recess. Due to the fact that the blade body recess tapers inwardly, the insert and shim will be wedged into the blade body recess. As the cutting tool assembly is contacted with the workpiece, the insert and shim will be wedged further into the blade body recess, thereby increasing the positive retention of the insert and shim.

As best seen in FIG. 3, the upper and lower peripheral edges of the insert are V-shaped and the upper and lower portions of the shim recess have V-shaped grooves. Thus, as the shim recess receives the insert, the V-shaped edges of the insert slidably engage the V-shaped grooves of the shim recess.

Figure 6:
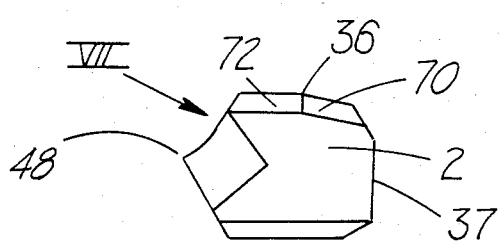
FIG. 6 is an enlarged view of a preferred embodiment of an insert.

In a preferred embodiment of an insert, FIG. 6, the upper peripheral edge 36 of the insert 2 is comprised of a rear upper portion 70 and a forward upper portion 72. The rear upper portion is downwardly inclined with respect to the forward upper portion.

Figure 7:
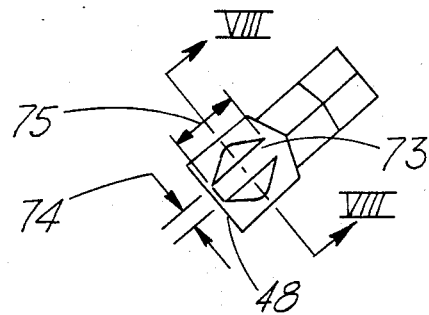
FIG. 7 is a view of the insert of FIG. 6 looking in the direction of arrow VII in FIG. 6.
Figure 8:
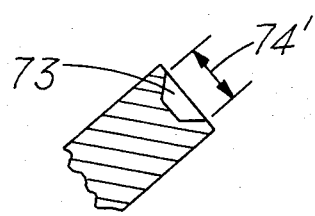
FIG. 8 is a sectional view of the insert of FIG. 6 indicated by line VIII—VIII of FIG. 7.

Referring now to FIGS. 7 and 8, the insert has a chip control slot 73 with a width 74 varying along its length 75. It is readily apparent that the width 74' of the slot at line VIII—VIII varies from the width 74. The slot extends upwardly and away from the forward cutting portion 48. The chip control slot has been found useful in controlling the configuration of the cut chip as it leaves the workpiece.

The blade body recess has a semi-circular portion 44 at the juncture of the upper and rear portions of the blade body recess. The shim has a V-shaped notch 46 at the juncture of the upper and rear peripheral edges of the shim. When the shim and insert are received by the blade recess, the semi-circular portion of the blade body recess communicates with the V-shaped notch of the shim.

In the assembly of the insert and shim and the blade body, the insert and shim would be placed in the blade body recess as previously described. However, assembly is aided by the V-shaped notch and the semi-circular portion. A screw driver blade or similar implement would be placed in the V-shaped notch. The screw driver blade would also make contact with the semi-circular portion. As the screw driver is twisted toward the front of the assembly, the insert and shim would be preloaded or wedged into the blade body. Subsequent contact with the workpiece would only increase the wedging action and, therefore, also increase the positive retention of the insert and shim.

The thickness of the insert in the plan view, FIG. 4, is greatest at the forward cutting portion 48. The thickness at the forward cutting portion is greater than the thickness of the shim and blade. It is preferable for the thickness 66 of the forward cutting portion 48 to be greater than the shim 68 or blade thickness 58 so that when a groove is cut into the workpiece, the possibility of the shim or blade rubbing up against the walls of the groove during forward movement of the cutting tool assembly is eliminated.

Preferably, the shim has a chamfer 50 at the juncture of the lower and rear peripheral edges of the shim. The purpose of the chamfer is to avoid the possibility of the shim engaging the rear portion of the blade body recess before the insert and shim are sufficiently wedged into the blade body recess.

Figure 9:
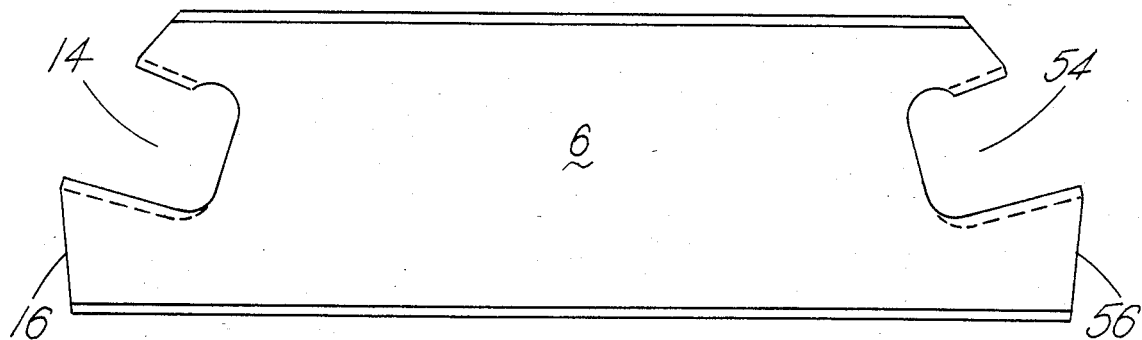
FIG. 9 is a modification of the blade body of FIG. 2.
Figure 10:
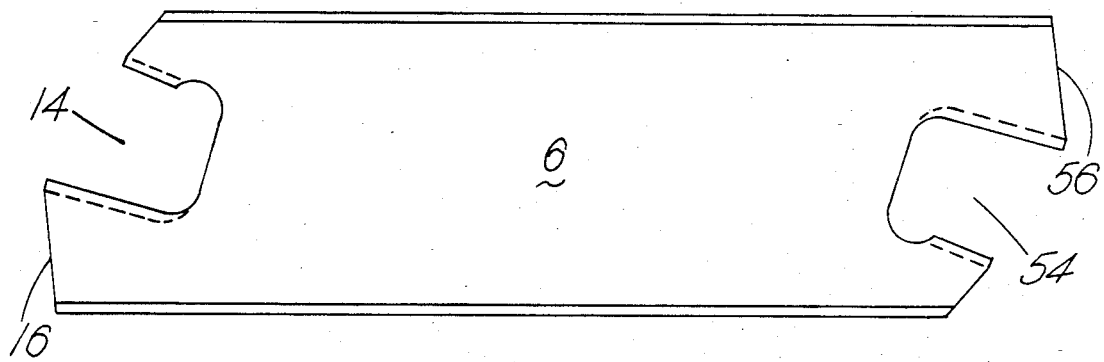
FIG. 10 is another modification of the blade body of FIG. 2.

In another embodiment of the blade body of the cutting tool assembly, FIG. 9, the blade body has a blade body recess 54 on a second end 56. In a preferred embodiment of the blade body, FIG. 10, the second blade body recess is oriented such that when the blade body is turned end over end, the blade body recess 54 on the second end will be in the same position formerly occupied by the blade body recess 14 on the first end 16.

The blade body is generally flat and plate-like and has a thickness 58 when viewed in plan, FIG. 4, much less than the width 60 when viewed from the side, FIG. 2.

The edges of the body, 7 and 9, are shown in FIG. 3 to be V-shaped, but the edges may also be rounded or flat, depending on the fixturing block used to retain the blade body.

When fully engaged, the profile 52 of the insert, shim and blade body is smooth and curvilinear above the forward cutting portion of the insert. When fully engaged, the profile 50 of the insert, shim and blade body is smooth and straight below the forward cutting portion of the insert.

After a period of use, the insert and shim will need to be removed from the blade body recess so that the insert can be replaced. If a screw driver or similar implement is placed in the gap 22, a prying action may be applied to the screw driver. This, in turn, will cause the insert and shim to be unwedged from the blade body recess. As discussed above, the insert may then be removed from the shim and replaced.

According to the invention, there is also a shim and insert, as a separate article of commerce, for use in a cutting tool assembly. A hard wear resistant insert 2 and a shim 4 comprise the assembly. The insert has a forward cutting portion 48, a seating portion 37 directly opposed to the cutting portion, an upper peripheral edge 36 and a lower peripheral edge 38. The shim has an upper arm 30 of substantially uniform cross section and a rearwardly extending recess 10 for receiving the insert. The recess has an upper portion 26, a lower portion 28 and a rear portion 12. The upper and lower portions of the shim recess engage the upper and lower peripheral edges, respectively, of the insert. The recess also tapers toward the open end of the recess to springingly hold the insert. When the shim and insert are fully engaged, the seating portion 37 of the insert rests against the rear portion 12 of the shim recess. The shim may also have a longitudinal slot 24 extending rearward of the shim recess.

As shown in FIG. 5, it is preferable that the shim have a land portion 23 of reduced cross sectional thickness rearward of the rear portion 12 of the shim recess 10. As best seen in FIG. 2, the land becomes the bottom of a notch 25 formed between the shim 4 and the seating portion 37 of the insert 2 when the shim recess receives the insert.

Preferably, the upper and lower peripheral edges of the insert are V-shaped and the upper and lower portions of the shim recess have V-shaped grooves. The V-shaped edges of the insert slidably engage the V-shaped grooves of the shim recess.

Preferably, also, the shim has an upper 40, lower 42 and rear 18 peripheral edge. Further, the upper and lower peripheral edges are V-shaped.

In a preferred embodiment of an insert, FIG. 6, the upper peripheral edge 36 of the insert 2 is comprised of a rear upper portion 70 adjacent to the seating portion 37 and a forward upper portion 72 adjacent to the forward cutting portion 48. The rear upper portion is downwardly inclined with respect to the forward upper portion.

Referring now to FIGS. 7 and 8, the insert has a chip control slot 73 with a width 74 varying along its length 75. It is readily apparent that the width 74' of the slot at line VIII—VIII varies from the width 74. The slot extends upwardly and away from the forward cutting portion 48.

The shim also has a V-shaped notch 46 at the juncture of the upper and rear peripheral edges of the shim.

The thickness 66 of the insert in plan view, FIG. 4, is greatest at the forward cutting portion 48. The forward cutting portion thickness is greater than the thickness 68 of the shim.

The shim may also have a chamfer 50 at the juncture of the lower and rear peripheral edges of the shim.

When the shim and insert are fully engaged, the profile 62 of the shim and insert is smooth and curvilinear above the cutting edge of the insert. Below the cutting edge of the insert, the profile 64 of the fully engaged shim and insert is smooth and straight.

Modifications may be made within the scope of the appended claims

What is claimed is:

1. A cutting tool assembly comprising: a hard wear resistant insert having a forward cutting portion, a shim and a blade body having a longitudinal axis, said shim having a rearwardly extending recess for receiving said insert, said insert resting against the rear portion of said shim recess, said shim recess tapering toward the open end of said shim recess to springingly hold said insert, said blade body having a downwardly and rearwardly extending recess on a first end for receiving said shim and insert, said blade body recess also being inclined to said longitudinal axis of said blade body, said blade body recess tapering toward said blade body to wedgingly hold said shim and insert.

2. The cutting tool assembly in claim 1 wherein the rear peripheral edge of said shim and the rear portion of said blade body recess form a gap when said insert, shim and blade body are fully engaged.

3. The cutting tool assembly in claim 2 wherein said shim has a longitudinal slot extending rearward of said shim recess.

4. The cutting tool assembly in claim 3 wherein said shim has a land portion of reduced cross sectional thickness rearward of said rear portion of said shim recess, said land being the bottom of a notch formed when said shim recess receives said insert.

5. The cutting tool assembly in claim 4 wherein the upper and lower peripheral edges of said insert are V-shaped and the upper and lower portions of said shim recess have V-shaped grooves, said V-shaped edges slidably engaging said V-shaped grooves.

6. The cutting tool assembly in claim 5 wherein the upper and lower peripheral edges of said shim are V-shaped and the upper and lower portions of said blade body recess have V-shaped grooves, said V-shaped edges slidably engaging said V-shaped grooves.

7. The cutting tool assembly in claim 6 wherein said upper peripheral edge of said insert is comprised of a rear upper portion and a forward upper portion, the rear upper portion being downwardly inclined with respect to the forward upper portion.

8. The cutting tool assembly in claim 7 wherein said insert has a chip control slot with a width varying along its length, said slot extending upwardly and away from the forward cutting portion.

9. The cutting tool assembly in claim 8 wherein said blade body recess has semi-circular portion at the juncture of the upper and rear portions of said blade body recess and said shim has a V-shaped notch at the juncture of the upper and rear peripheral edges of said shim, said semi-circular portion communicating with said V-shaped notch when said shim and insert are received by said blade recess.

10. The cutting tool assembly in claim 9 wherein the thickness of said insert in plan view is greatest at the forward cutting portion, said thickness being greater than the thickness of said shim and blade.

11. The cutting tool assembly in claim 10 wherein said shim has a chamfer at the juncture of the lower and rear peripheral edges of said shim.

12. The cutting tool assembly in claim 1 wherein said blade body has a blade body recess on a second end.

13. The cutting tool assembly in claim 12 wherein when said blade body is turned end over end, the blade body recess on said second end will be in the same position formerly occupied by said blade body recess on said first end.

14. The cutting tool assembly in claims 11 or 13 wherein said blade body is generally flat and plate-like and has a thickness when viewed in plan much less than the width when viewed from the side.

15. The cutting tool assembly as in claim 1 wherein the profile of said insert, shim and blade body when fully engaged is smooth and curvilinear above the forward cutting portion of said insert.

16. The cutting tool assembly as in claim 15 wherein the profile of said insert, shim and blade when fully engaged is smooth and straight below the forward cutting portion of said insert.

17. A shim and insert for use in a cutting tool assembly comprising: a hard wear resistant insert and a shim, said insert having a forward cutting portion, a seating portion directly opposed to said cutting portion, an upper peripheral edge and a lower peripheral edge; said shim having an upper arm of substantially uniform cross section and a rearwardly extending recess for receiving said insert, said recess having an upper portion, a lower portion and a rear portion; the upper and lower portions of said shim recess engaging the upper and lower peripheral edges, respectively, of said insert, said recess tapering the open end of said recess to springingly hold said insert, said shim having a longitudinal slot extending rearward of said recess, and when said shim and insert are fully engaged, the seating portion of said insert rests against the rear portion of said shim recess, said shim having a land portion of reduced cross sectional thickness rearward of said rear portion of said shim recess, said land being the bottom of a notch formed between said shim and said seating portion of said insert when said shim recess receives said insert.

18. The shim and insert of claim 17 wherein the upper and lower peripheral edges of said insert are V-shaped and the upper and lower portions of said shim recess have V-shaped grooves, said V-shaped edges slidably engaging said V-shaped grooves.

19. The shim and insert of claim 18 wherein said shim has an upper, lower and rear peripheral edge, said upper and lower peripheral edges being V-shaped.

20. The shim and insert of claim 19 wherein said upper peripheral edge of said insert is comprised of a rear upper portion adjacent to the seating portion and a forward upper portion adjacent to the forward cutting portion, the rear upper portion being downwardly inclined with respect to the forward upper portion.

21. The shim and insert of claim 20 wherein said insert has a chip control slot with a width varying along its length, said slot extending upwardly and away from the forward cutting portion.

22. The shim and insert of claim 21 wherein said shim has a V-shaped notch at the juncture of the upper and rear peripheral edges of said shim.

23. The shim and insert of claim 22 wherein the thickness of said insert in plan view is greatest at the forward cutting portion, said thickness being greater than the thickness of said shim.

24. The shim and insert of claim 23 wherein said shim has a chamfer at the juncture of the lower and rear peripheral edges of said shim.

25. The shim and insert of claim 24 wherein the profile of said insert and shim when fully engaged is smooth and curvilinear above the forward cutting portion of said insert.

26. The shim and insert of claim 25 wherein the profile of said insert and shim when fully engaged is smooth and straight below the forward cutting portion of said insert.

* * * * *